United States Patent

Worthley

Patent Number: 5,098,174
Date of Patent: Mar. 24, 1992

[54] AUTOMOTIVE CLEANING KIT APPARATUS

[76] Inventor: Christopher J. Worthley, 17 Calthrope Rd., Marblehead, Mass. 01945

[21] Appl. No.: 685,879

[22] Filed: Apr. 16, 1991

[51] Int. Cl.$^5$ ............................................. A47B 83/00
[52] U.S. Cl. ..................... 312/277; 312/244; 108/26; 248/146
[58] Field of Search ............... 312/277, 206, 229, 244, 312/228, 255, 111; 220/550, 553, 555; 108/26, 91; 248/146, 154

[56] References Cited

U.S. PATENT DOCUMENTS

| | | | |
|---|---|---|---|
| 2,103,552 | 12/1937 | Radyx | 312/277 X |
| 3,887,103 | 6/1975 | Spooner | 220/555 |
| 3,902,637 | 9/1975 | Scheeler | 222/144.5 |
| 4,031,663 | 6/1977 | Brunk | 248/146 X |
| 4,231,299 | 11/1980 | Gebhardt et al. | 108/91 |
| 4,398,653 | 8/1983 | Daloisio | 248/146 X |

FOREIGN PATENT DOCUMENTS

| | | | |
|---|---|---|---|
| 145792 | 1/1936 | Austria | 108/26 |
| 2234612 | 1/1974 | Fed. Rep. of Germany | 108/91 |

*Primary Examiner*—Kenneth J. Dorner
*Assistant Examiner*—Brian K. Green
*Attorney, Agent, or Firm*—Leon Gilden

[57] ABSTRACT

An apparatus including a table mounting a container thereon. The table includes a matrix of hook members to mount spray bottles thereon containing various cleaning and maintenance fluids. The table further includes a central recess containing an "I" shaped handle telescopingly nested therewithin. The table tops include boss plug members for positioning and alignment of "V" shaped grooves directed through each corner of the container. The container includes a plurality of compartments, wherein the compartments include a chamois cloth and a brush.

5 Claims, 4 Drawing Sheets

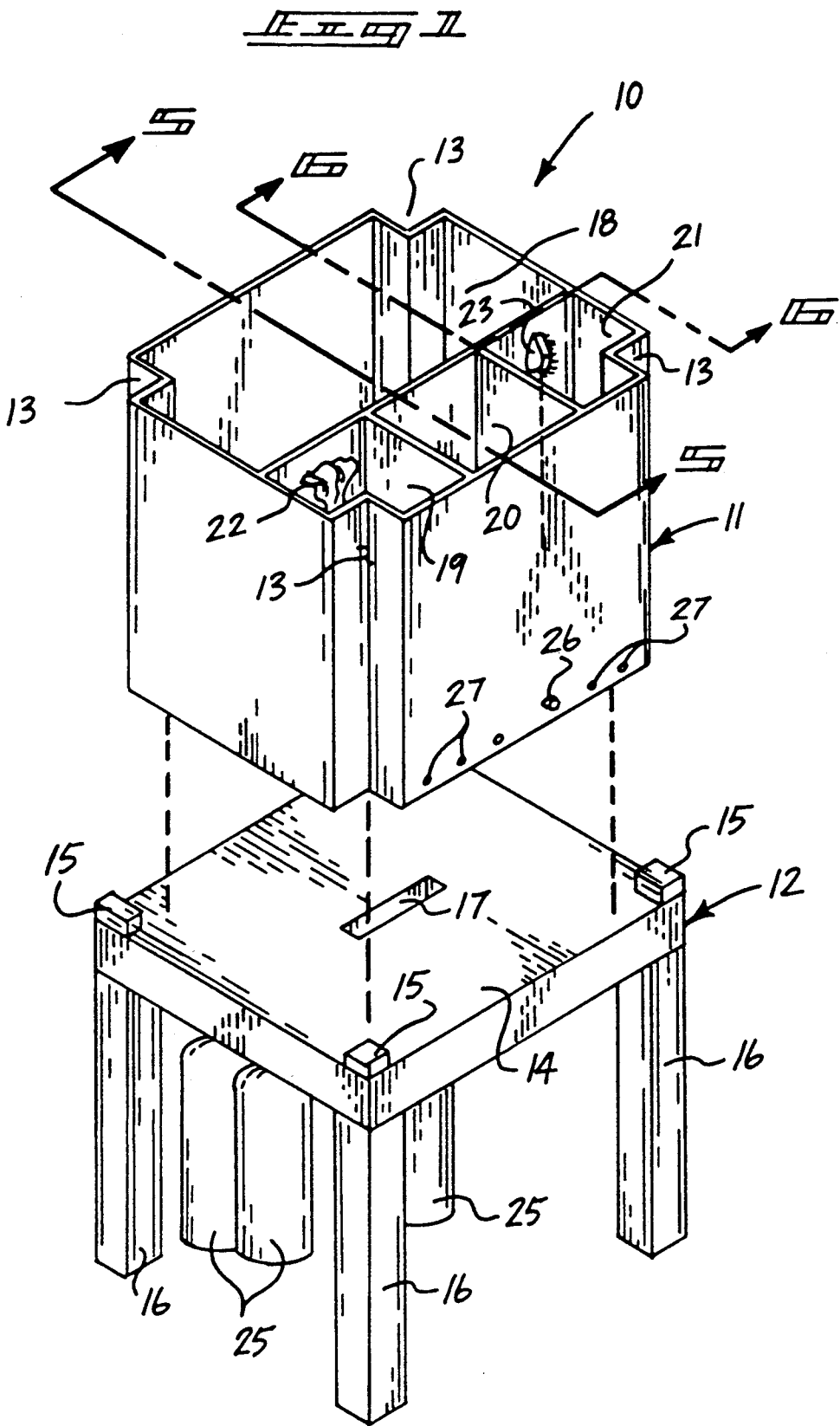

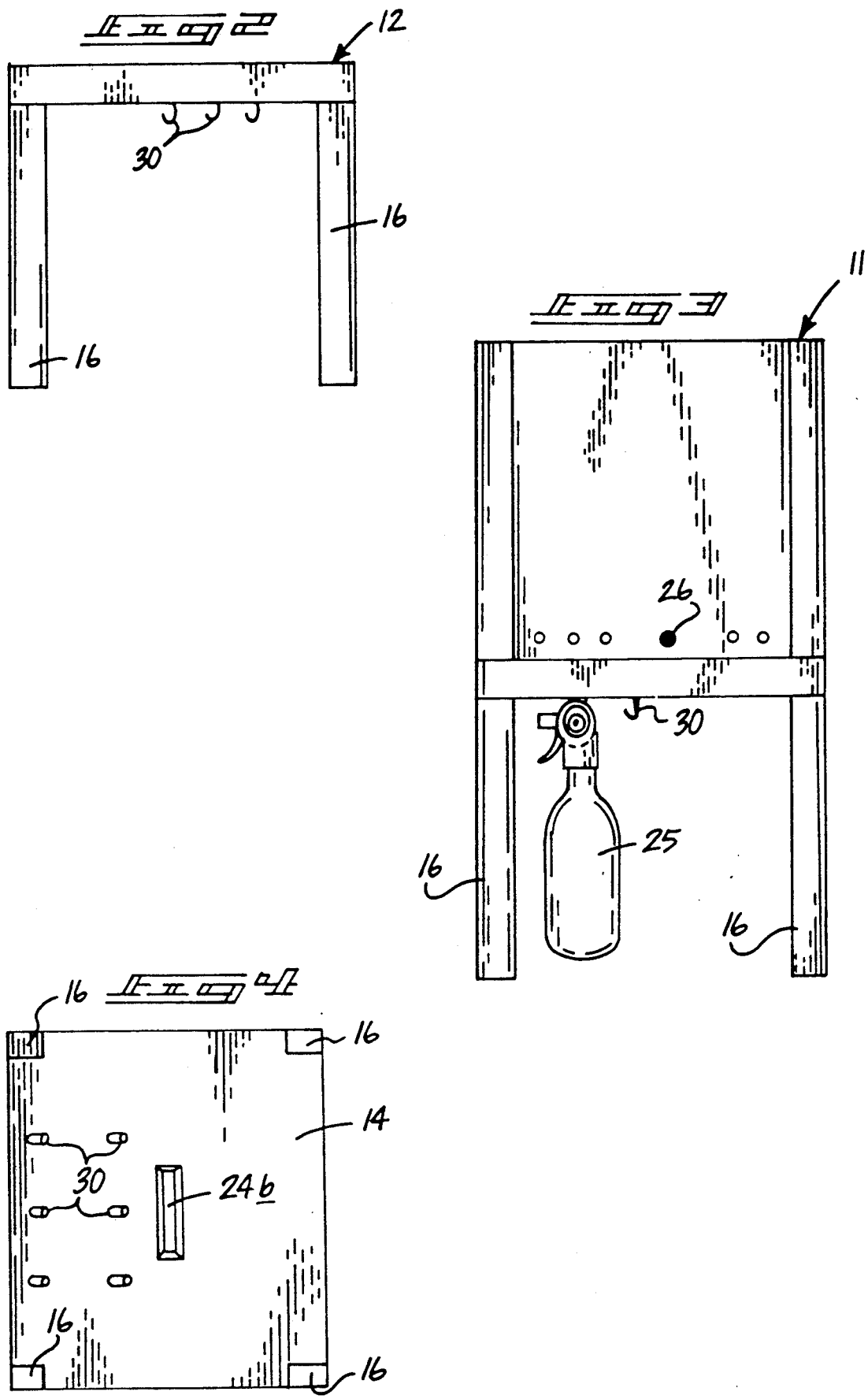

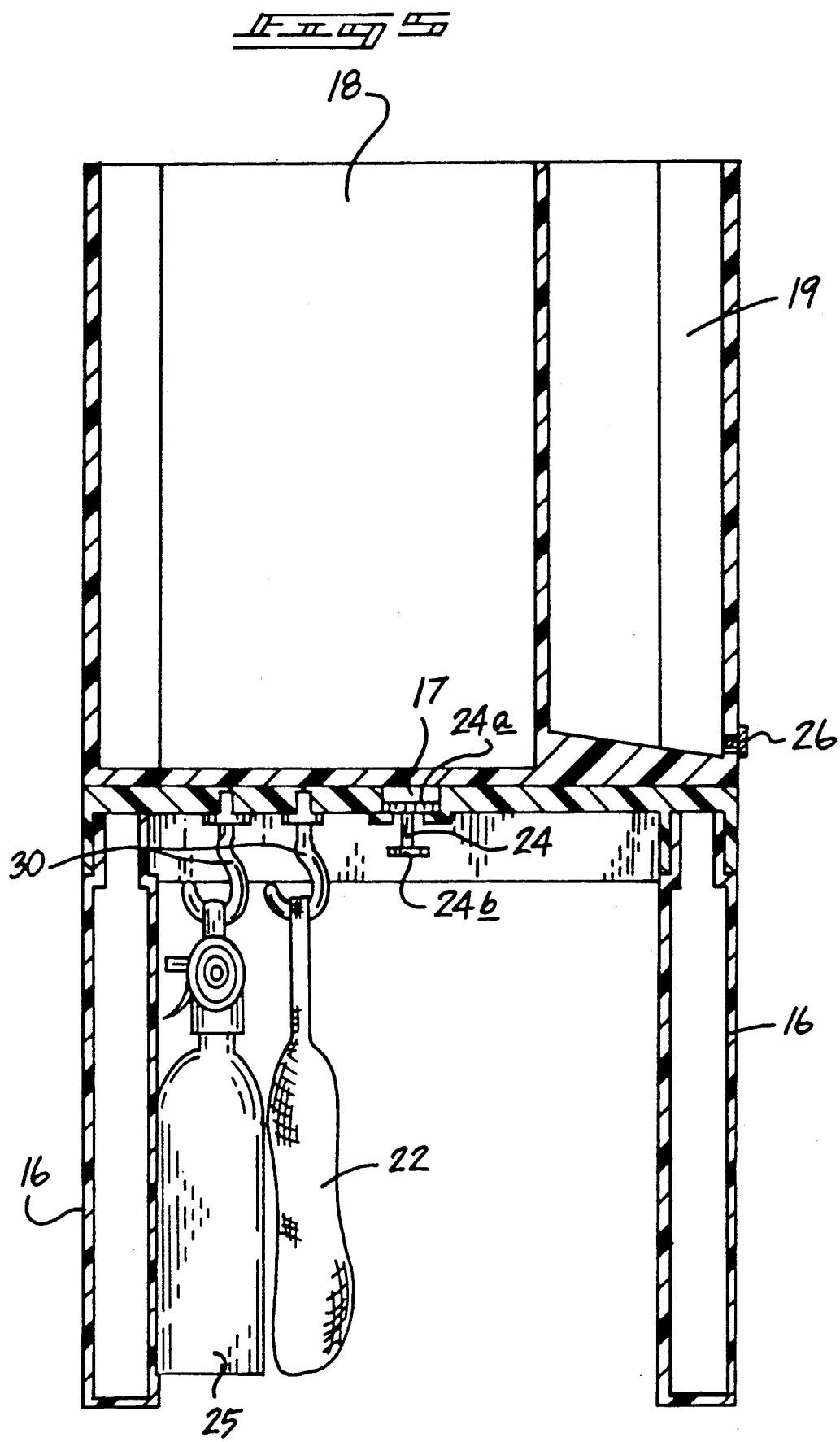

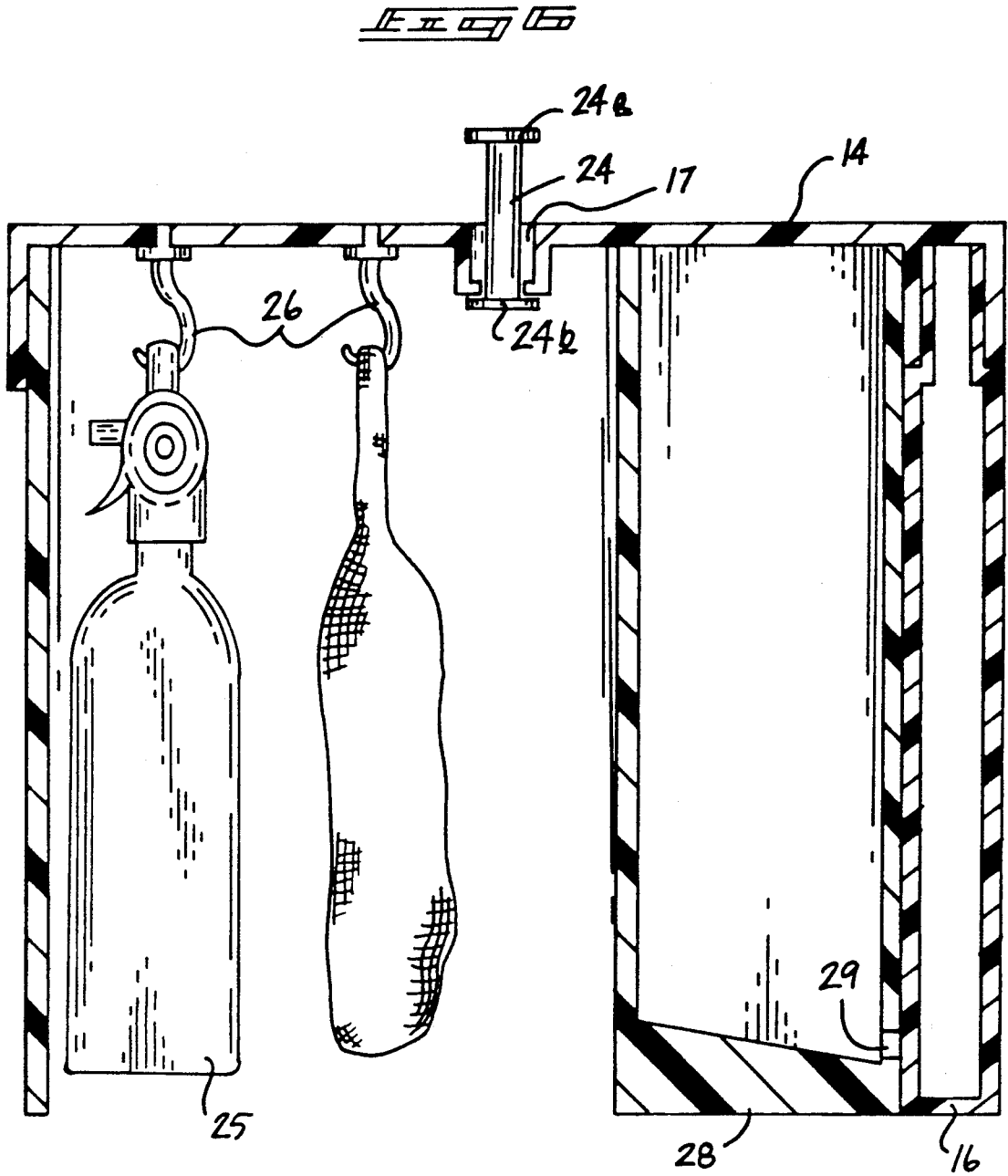

AUTOMOTIVE CLEANING KIT APPARATUS

BACKGROUND OF THE INVENTION

1. Field of the Invention

The field of invention relates to cleaning apparatus, and more particularly pertains to a new and improved automotive cleaning kit apparatus wherein the same provides an assembly for the cleaning and maintenance of an automotive vehicle.

2. Description of the Prior Art

Various components are utilized in the maintenance and care of an automotive interior and exterior. The use of such care involves the assemblage of various cleaning components, such as containers, cleaning fluid, and the like. The instant invention attempts to overcome deficiencies of the prior art by providing a kit structure assembling various components for ease of use of an individual. Prior art structure setting forth various kits in use in automotive environments may be found for example in U.S. Pat. No. 2,982,392 to Bossone setting forth a safety kit for use with an automobile utilizing various elements and assemblage, such as a flashlight, scraper, and the like.

U.S. Pat. No. 1,071,662 to Burgener sets forth an illumination member housing various accessory components thereon.

U S. Pat. No. 844,481 utilizes a receptacle structure mounting various flares and the like for use in an automotive environment.

U.S. Pat. No. 2,450,172 to Stoner and U.S. Pat. No. 2,649,606 to Fadner sets forth a vacuum cleaner apparatus utilizing various elements mounted thereon in a kit structure.

As such, it may be appreciated that there continues to be a need for a new and improved automotive cleaning kit apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of cleaning apparatus now present in the prior art, the present invention provides an automotive cleaning kit apparatus wherein the same sets forth an assemblage of various components utilized in cleaning an automobile in maintaining the exterior and exterior surfaces thereon. As such, the general purpose of the present invention, which will be described subsequently in greater detail, is to provide a new and improved automotive cleaning kit.

To attain this, the present invention provides an apparatus including a table mounting a container thereon. The table includes a matrix of hook members to mount spray bottles thereon containing various cleaning and maintenance fluids. The handle further includes a central recess containing an "I" shaped handle telescopingly nested therewithin. The table tops include boss plug members for positioning and alignment of "V" shaped grooves directed through each corner of the container. The container includes a plurality of compartments, wherein the compartments include a chamois cloth and a brush in various of the compartments.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved automotive cleaning kit apparatus.

It is another object of the present invention to provide a new and improved automotive cleaning kit apparatus which may be easily and efficiently manufactured and marketed.

It is a further object of the present invention to provide a new and improved automotive cleaning kit apparatus which is of a durable and reliable construction.

An even further object of the present invention is to provide a new and improved automotive cleaning kit apparatus which is susceptible of a low cost of manufacture with regard to both materials and labor, and which accordingly is then susceptible of low prices of sale to the consuming public, thereby making such automotive cleaning kit apparatus economically available to the buying public.

Still yet another object of the present invention is to provide a new and improved automotive cleaning kit apparatus which provides in the apparatuses and methods of the prior art some of the advantages thereof, while simultaneously overcoming some of the disadvantages normally associated therewith.

Still another object of the present invention is to provide a new and improved automotive cleaning kit apparatus wherein the same is arranged for mounting various components utilized in cleaning procedures for use in an automotive environment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic side view of the table of the instant invention.

FIG. 3 is an orthographic side view, taken in elevation, of the organization in an assembled configuration.

FIG. 4 is an orthographic bottom view of the table of the instant invention.

FIG. 5 is an orthographic view, taken along the lines 5—5 of FIG. 1 in the direction indicated by the arrows.

FIG. 6 is an orthographic view, taken along the lines 6—6 of FIG. 1 in the direction indicated by the arrows.

DESCRIPTION OF THE PREFERRED EMBODIMENT

With reference now to the drawings, and in particular to FIGS. 1 to 6 thereof, a new and improved automotive cleaning kit apparatus embodying the principles and concepts of the present invention and generally designated by the reference numeral 10 will be described.

More specifically, the automotive cleaning kit apparatus 10 of the instant invention essentially comprises an upper cleaner housing 11 of a generally rectangular crosssectional configuration mounted to a table top surface 14 of an associated lower support table 12, wherein the table top surface 14 includes a projecting boss 15 fixedly and integrally mounted to each corner of the table top surface 14 to be complementarily received within a lower terminal end of a "U" shaped groove 13 formed at each corner of the container housing 11 to stabilize and position the container to the top surface of the table 12. The table includes a plurality of table legs 16 mounted to each corner of the table to a bottom surface thereof, with a table slot 17 projecting medially through the table. The table slot 17 mounts an "I" shaped handle 24 therethrough, wherein the "I" shaped handle 24 includes an upper flange 24a and a lower flange 24b (see FIGS. 5 and 6). In this manner, the "I" shaped handle is nested within the table slot 17 in a first position to permit a combination of the container housing 11 thereon, with the handle 24 projecting above the top surface of the table, wherein the upper flange 24a is utilized as a handle for transport of the table. The lower flange 24b is arrested by projecting opposed flanges in the table top surface to prevent removal of the handle 24 from the slot 17.

The container housing 11 is defined by a first container 18 defining essentially one-half or more of the volume of the container, with the remainder of the container divided into a respective second, third, and fourth container 19, 20, and 21. The second and fourth containers are positioned exteriorly of the medially positioned third container 20 that utilizes a drain plug aperture and associated removable drain plug 26, wherein the third container 20 is typically utilized with rinsing water as opposed to a soap water solution positioned within the first container 18. A second and fourth container 19 and 20 are utilized to mount washing accessories thereon, such as a chamois cloth 22 within the second container 19 and an elongate brush 23 mounted within the fourth container 21. A series of spray bottles 25 are mounted to hooks 30 fixedly secured to a bottom surface of the table plate of the table 12. The spray bottles 25 include a spray bottle of varying solutions for each of the hook members 30. Particularly, two rows of three hook members each are utilized for the storage of the spray bottles 25 thereon. In lieu of a spray bottle 25, an additional chamois cloth 22 may be mounted and suspended upon one of the hook members 30. It should be further noted that drain apertures 27 are directed adjacent a floor of each of the second and fourth containers, whereupon use of and positioning of a chamois cloth 22 or a brush 23 within the second and fourth containers permit the draining of excess fluid and water from the members within the second and fourth containers.

It should be further noted that a container insert 28 of a complementary configuration to an interior surface of the third container is provided, wherein the container insert 28 permits use of caustic fluids and the like to be positioned within the third container, wherein during periods of non-use, the container insert is positioned underlying the plate of the table 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An automotive cleaning kit apparatus, comprising in combination,
    an upper container housing, the upper container housing defined by a generally rectangular cross-sectional configuration, with the container housing including a plurality of partition walls defining a plurality of containers therewithin, and
    a lower support table, the lower support table including a support plate complementarily receiving a floor of the upper container housing thereon, and
    the plate including a plurality of projecting bosses fixedly mounted to a top surface of each corner of the plate defining a predetermined number of bosses, and
    the lower container housing including a plurality of "V" shaped grooves formed within each corner of the upper container housing defining a predetermined number of "V" shaped grooves equal to the predetermined number of bosses to receive said bosses to position and align the upper container housing on the plate, and
    wherein the plate includes a through-extending table slot projecting medially through the plate, and the table slot including an "I" shaped handle reciprocatably mounted therewithin, the "I" shaped handle including an upper flange spaced from a lower flange, and the upper flange recessed below the plate in a first position and projecting above the plate in a second position to permit utilization of the "I" shaped handle for transport of the table.

2. An apparatus as set forth in claim 1 wherein the table includes a plurality of table legs, and the table includes a plurality of hook members mounted to a bottom surface of the plate, and each hook member including a spray bottle mounted thereon, and each of the spray bottles including cleansing and preservative fluids contained therewithin.

3. An apparatus as set forth in claim 2 wherein the plurality of containers includes a first container, a second container, a third container, and a fourth container, the first container defining substantially one-half of a predetermined volume defined by the container housing, and the second container, third container, and fourth container aligned in a single row, and the third container positioned medially of the second container and the fourth container, and the second container including a chamois cloth contained therewithin, and the fourth container including a brush member contained therewithin.

4. An apparatus as set forth in claim 3 wherein the third container includes a drain aperture positioned adjacent a floor of the third container, and a removable drain plug directed through the drain aperture, and the second container and the fourth container each include a series of further drain apertures directed through the second container and fourth container adjacent a second floor defined by the second container and a fourth floor defined by the fourth container to permit drainage of excess fluid from the second container and fourth container from the respective chamois cloth and the brush.

5. An apparatus as set forth in claim 4 further including a container insert, the container insert defined by a predetermined external configuration, and the third container is defined by a predetermined internal configuration, wherein the predetermined internal configuration is complementary to the external configuration of the container insert, wherein the container insert is arranged to receive caustic fluids therewithin minimizing damage to the third container.

* * * * *